United States Patent
Sauerwein, Jr.

(10) Patent No.: US 9,158,000 B2
(45) Date of Patent: Oct. 13, 2015

(54) ENHANCED LOCATION BASED SERVICES

(75) Inventor: James Timothy Sauerwein, Jr., Charlotte, NC (US)

(73) Assignee: Honeywell International Inc., Fort Mill, SC (US)

( * ) Notice: Subject to any disclaimer, the term of this patent is extended or adjusted under 35 U.S.C. 154(b) by 461 days.

(21) Appl. No.: 13/494,446

(22) Filed: Jun. 12, 2012

(65) Prior Publication Data

US 2013/0328717 A1    Dec. 12, 2013

(51) Int. Cl.
*G01S 19/06*    (2010.01)

(52) U.S. Cl.
CPC ...................... *G01S 19/06* (2013.01)

(58) Field of Classification Search
USPC ............... 342/357.22, 357.4, 357.42, 357.46; 701/467, 468
See application file for complete search history.

(56) References Cited

U.S. PATENT DOCUMENTS

| | | |
|---|---|---|
| 5,266,958 A | 11/1993 | Durboraw |
| 2007/0046535 A1 | 3/2007 | May et al. |
| 2009/0009397 A1 | 1/2009 | Taylor et al. |

*Primary Examiner* — Dao Phan
(74) *Attorney, Agent, or Firm* — Additon, Higgins & Pendleton, P.A.

(57) ABSTRACT

A device management system is comprised of a server-side proxy component and at least one back-end computer. The server-side proxy component is configured to receive ephemeris and almanac data from a source and information from at least one client describing the geographic location of the client. The server-side proxy component is configured to send the ephemeris and almanac data and the information from the client to a back-end computer. Responsive to receiving this data and information, the computer compiles it into GPS data relevant to the location of the client.

17 Claims, 6 Drawing Sheets

ENHANCED LOCATION BASED SERVICES

FIELD OF INVENTION

The present invention provides a system and method to increase the efficiency and accuracy of location-based services.

BACKGROUND OF INVENTION

Accuracy and Time To First Fix (TTFF) are critical parameters for any Global Positioning System (GPS) location based service. TTFF is the measure of time required for a GPS receiver to acquire satellite signals and navigation data, and calculate a position solution, which is called a "fix," a position derived from measuring external reference points.

In a traditional GPS system, the GPS receiver must find the satellites in order to establish a location fix. The satellites and generally, the GPS receiver are in motion, thus there is finite shelf life for the satellite constellation data. Ephemeris and almanac data provide clues as to where the satellites should be for a short term (ephemeris) and longer term (almanac). This data is transmitted by the satellites. However, this data is a very low baud rate, and is broadcast only—there is no handshake. Thus, a GPS receiver must wait until data is broadcast, it cannot query when the data is needed. Thus, it may take a GPS receiver a long time to achieve a fix.

GPS navigation satellites transmit electronic ephemeris data consisting of health and exact location data that GPS receivers then use (together with the signal's elapsed travel time to the receiver) to calculate their own location on Earth using trilateration. This ephemeris data is broadcast from the satellites and is used to locate the satellite. But collection of the ephemeris data from the satellite can be slow and problematic.

An alternative to gathering the ephemeris data locally is to create an almanac of the satellite position(s) and send this data to the GPS receiver. The major drawback to this approach is obtaining the almanac data and delivering the data to the GPS receiver.

Another issue with traditional almanac data is the shelf-life of the data. GPS satellites tend to drift in orbit and experience slight changes in position based on a number of external factors. Thus, almanac data is valid for a maximum of 14 days.

A need therefore exists for a way to increase the speed and accuracy of location-based services using GPS by utilizing ephemeris data more effectively.

SUMMARY OF INVENTION

An object of the present invention is to provide location-based data to a pool of devices in a fast and effective manner.

Another object of the present invention is to generate ephemeris data relevant to the current position of a pool of managed devices and enhanced or extended ephemeris data to improve the positional accuracy of the system as the satellites make predictable movements.

Another object of the present invention is to create custom almanac data of ephemeris data based and transmit that data to a GPS receiver in an efficient and cost effective manner.

Another object of the present invention is to track approximate locations of satellites in order to tailor ephemeris data to the predicted locations.

An embodiment of the present invention includes the following components: a) a known general location for one or more GPS receivers; b) a communications connection to the GPS receiver; and c) one or more computers configured to execute program code to create tailored almanacs and extended ephemeris data based on the expected location of the GPS receiver.

The one or more computers are referred to as a "device management system." Additionally, the term "GPS receiver" refers to any device capable of receiving GPS data.

In one embodiment of this invention, communication with satellites is centrally managed by the device management system. Because satellites broadcast data at given intervals and there is no handshake, the central device management system continuously received the broadcast satellite GPS data at the broadcast intervals. Then, when a device with a GPS receiver for which the device management system has a known location, requests GPS data, the device management system itself sends the data to the device. This process circumvents possible communications issues between the GPS receivers and satellites at the time location-based services are requested. In this embodiment, a central device management system, including but not limited to one or more computer or servers with a communications connection, consistently collects GPS constellation data. This device and management system tailors the content to various GPS receivers.

In this embodiment, upon communication with the device management system, the GPS receivers receive the tailored content. The data sent to each GPS receiver is tailored to that GPS receiver based on its known general location.

Thus, the device management system in this embodiment is tasked with receiving satellite transmissions at broadcast intervals, making current information available to the GPS receivers without the shortcomings of the GPS receivers communicating directly with the satellites, and tailoring the data collected in response to specific requests from GPS receivers.

In another embodiment of the present invention, the GPS receivers maintain an open communication channel with the device management system. The device management system tracks the expected position of each GPS receiver. Whenever pertinent data is available, the device management system sends the GPS receiver tailored almanac and extended ephemeris data based on the expected location of the GPS receiver. Thus, the GPS receiver automatically receives updated data, rather than receiving it upon request.

In another embodiment of the present invention, a client device, examines the age of the almanac and extended almanac data received from the device management system. If the client deems this data to be out of date, the client requests updated content from the device management system. In response to this request, the device management system creates and sends the client a custom almanac. In further embodiments, the device management system creates and stores current custom almanacs, which it can supply upon request to a client without having to process the data at that time.

In another embodiment of the present invention, rather than receive ephemeris and almanac data from the satellites, this data is received by the device management system via a feed from National Oceanic and Atmospheric Administration (NOAA) and/or the National Institute of Standards and Technology (NIST). Ephemeris and almanac data available from satellites is relevant to devices utilizing GPS in a given area. For example, one area covers Toronto to New Jersey. However, a receiver positioned in the United States cannot receive satellite data (ephemeris and almanac) relevant to the position of device in China, for example. Thus, in an embodiment of the present invention, when the device management system is located in an area where the ephemeris and almanac data from satellites is not relevant to the devices managed, this data is acquired from a feed instead.

DETAILED DESCRIPTION OF THE INVENTION

The present invention provides a system and method to increase the efficiency and accuracy of location-based services.

The present invention provides a system and method to generate ephemeris data relevant to the current position of a pool of managed devices.

Figure 1:
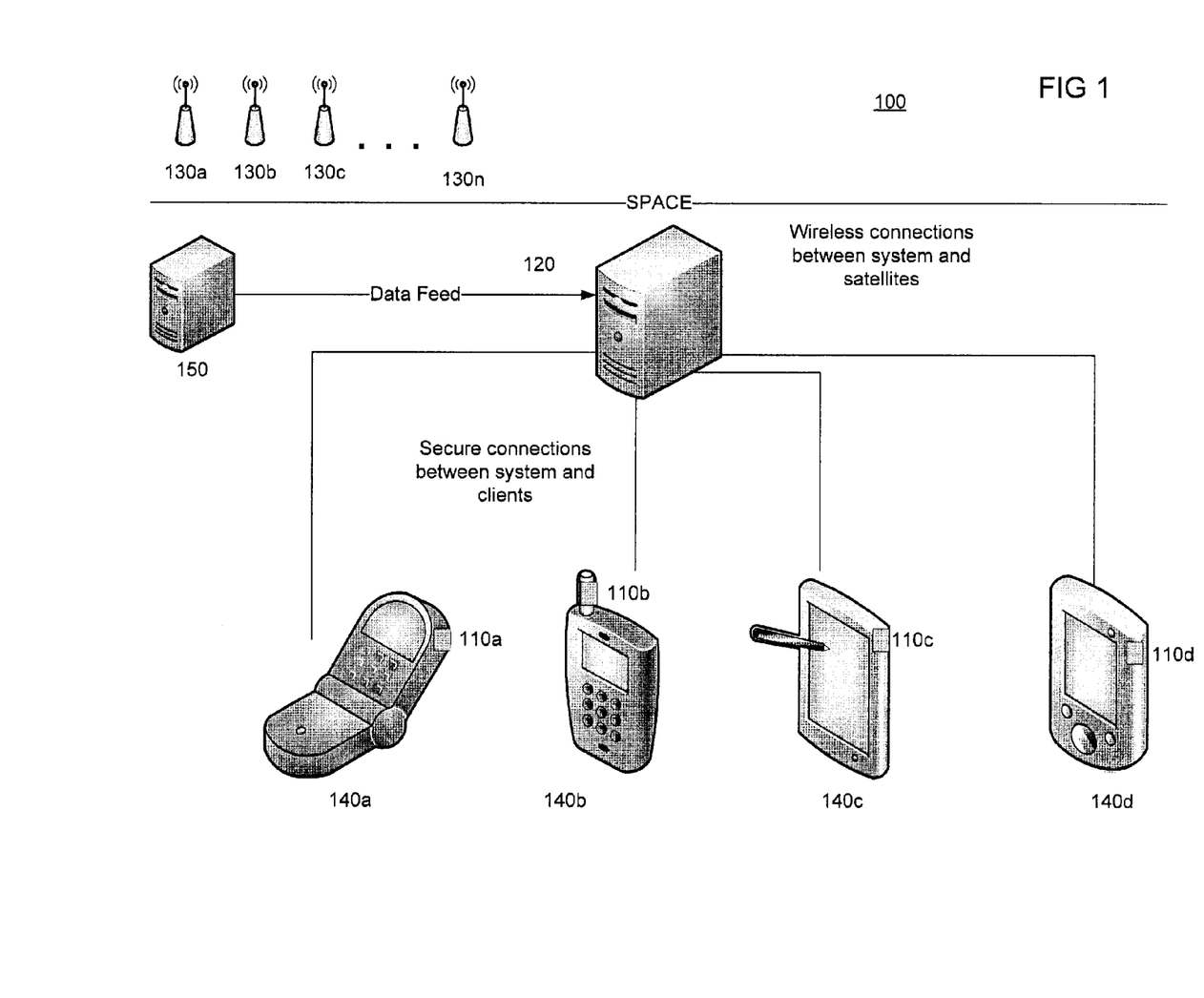
FIG. 1 depicts an embodiment of the present invention.

FIG. 1 depicts a technical architecture 100 of an embodiment of the present invention. The architecture includes a number of client devices 140a-140d integrated with GPS receivers 110a-110d. As aforementioned, GPS receivers refer to devices capable of receiving GPS data. These clients 140a-140d include various devices with integrated GPS reception functionality, including but not limited to, car GPS units, smartphones, personal data terminals, and/or personal GPS units. Although not pictured in FIG. 1, devices also include less traditional devices such as laptops, desktops, servers, and encoded information reading (EIR) terminals, including bar code scanning devices and/or RFID readers, image capture devices.

The GPS receivers have a communication connection, in this embodiment, either a wired and/or a wireless communication connection, with a device management system 120. The communication connections in further embodiment of the present invention include, but are not limited to, connections to the device management system 120 over both private and/or public networks. For example, a given client 140a-140d may connect to the device management system over a WAN, a LAN, and/or the Internet. The connection may use encryption and/or security. In one embodiment of the present invention, the GPS receivers 110a-110d connect to the device management system via a VPN.

Figure 2:
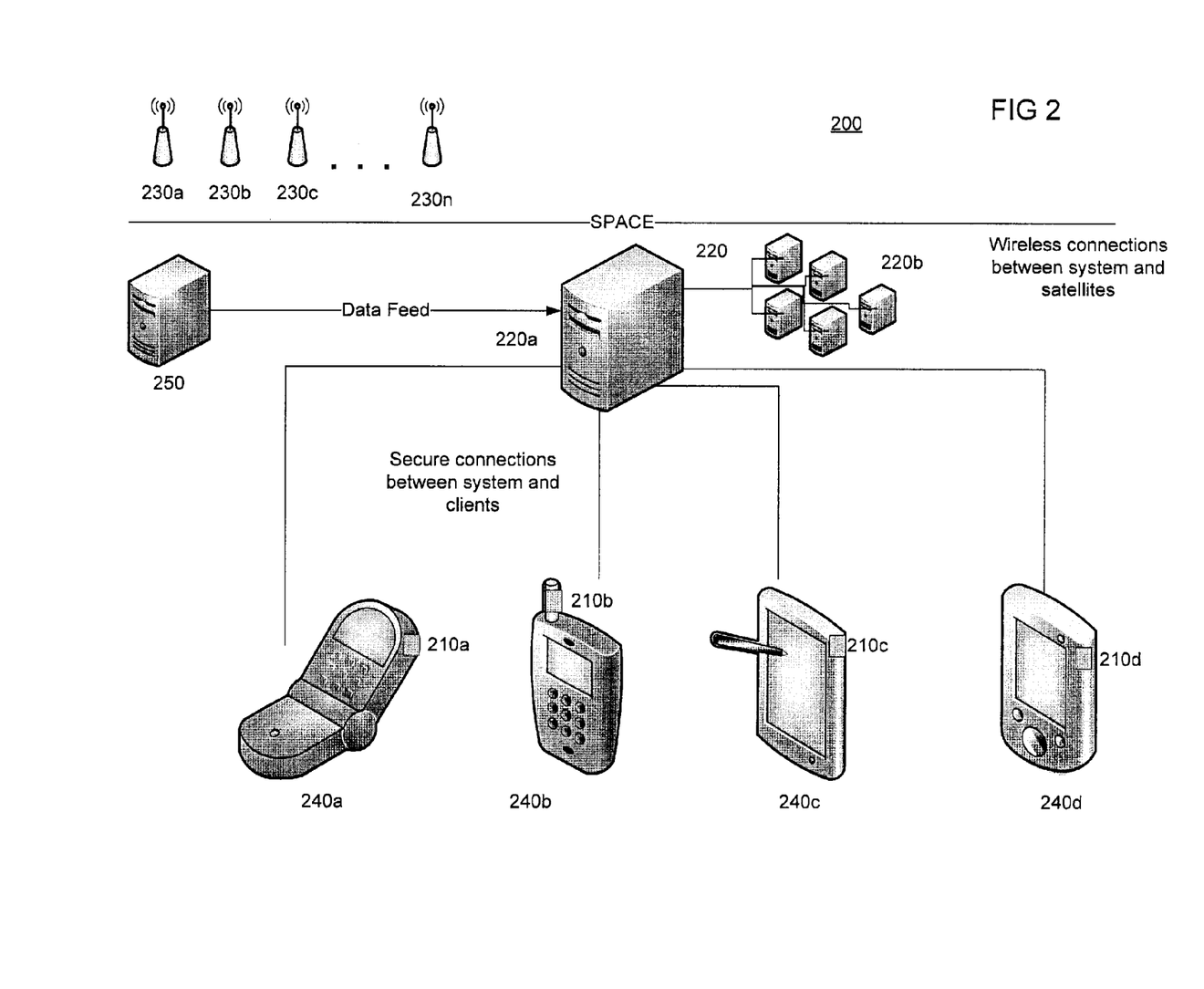
FIG. 2 depicts an embodiment of the present invention.

The device management system 120 is comprised of one or more computers capable of executing program code on one or more processors. Each of the one or more computers can have one or more processors. The computer code executed on these one or more processors can be located on a storage resource accessible to the processor(s), which can be internal and/or external to the device management system. Embodiments of this device management system 120 include a cloud, where processing requests are received by one or more resources and off-loaded to available resources within the cloud. The cloud embodiment of the device management system 120 is shown in FIG. 2. This embodiment of the device management system 220 is comprised of a server-side proxy 220a for load distribution, and at least one back-end computer 220b. For ease of understanding, the remainder of the components pictured in FIG. 2 coordinate with the components depicted in FIG. 1, but instead of beginning with the number "1," these components are labeled, to avoid confusion, beginning with the number "2."

The device management system 120 communicates with GPS satellites 130a-130n and maintains a data store of ephemeris data on one or more storage resources within the device management system 120. In an embodiment of the present invention, the device management system 120 also periodically tracks the positions of the GPS receivers 110a-110d. The position data is saved in a memory resource either located within the device management system 120 and/or external but accessible to the device management system 120. For example, the device management system 120 may off-load data when the local resources are exceeded. To save storage space on the resource(s), in an embodiment of the present invention, the device management system 120 overwrites old positioning data from the GPS receivers 110a-110d and ephemeris data from the satellites 130a-130n with newer data.

In an embodiment of the present invention, the GPS receivers 110a-110d communicate regularly with the device management system 120. The clients 140a-140d with GPS receivers 110a-110d can be understood as managed clients, in that the device management system 120 is aware of the GPS receivers 110a-110d and of the locations of the GPS receivers 110a-110d. Communications over a secure communications transport between the GPS receivers 110a-110d and the device management system 120 occur at regular intervals. During at least some of these communications, the GPS receivers 110a-110d indicate their positions to the device management system 120. Also during at least some of these communications, the device management system 120 sends the GPS receivers 110a-110d almanacs of ephemeris data that are customized based on the position (or approximate position depending on when the last position was communicated) of each GPS receiver 110a-110d.

In addition to communicating regularly with the GPS receivers 110a-110d, in this embodiment, the device management system 120 also communicates with the satellites, 130a-130n at predetermined intervals, including but not limited to, at least once every fourteen days (14). The device management system 120 compiles the ephemeris data it collects from the satellites 130a-130n. As aforementioned, the GPS satellites broadcast data at given intervals, there is no handshake between devices that receive the signal and the satellites 130a-130n. Thus, the device management system 120 receives the ephemeris and almanac data when it is broadcast by the satellites 130a-130n.

In this embodiment: (1) the device management system 120 at all times knows the general location of each GPS receiver 110a-110d; (2) there is a secure communication transport between each GPS receiver 110a-110d and the device management system 120; and (3) a resource available in the device management system 120 compiles the ephemeris data it collects from satellites 130a-130n and creates custom almanacs for the managed clients 140a-140d, the GPS receivers 110a-110d, based on their positions.

To send the relevant ephemeris data and almanac to a managed client 140a-140d, the device management system 120 needs an approximate position. The ephemeris data for a device is Toronto, Canada, is the same as the ephemeris data relevant to a device in Hoboken, N.J. Thus, provided that a the device management system 120 knows that the device is a general geographic area, for example, in the Northeastern United States, the device management system 120 can supply the correct ephemeris data and almanac.

In an embodiment of the present invention, the device management system 120 obtains ephemeris and almanac data from a data feed 150 available from organizations including NOAA and/or NIST, upon subscription to this service, in conjunction with data from the satellites 130a-130n. The data feed 150 is particularly useful when the device management system 120 is in a different region than one or more of the managed devices 140a-140d, i.e., a place where the ephemeris and almanac data is different. The ephemeris and almanac data available from the satellites 130a-130n is specific to the geographic location of the device management system 120. Thus, the device management system 120 utilizes the data feed 150 to obtain data relevant to the devices in geographic areas that require a different data set due to the disparate location. Varying embodiments of the present invention utilize the data feed, satellite data, and/or both.

The device management system 120 is FIG. 1 is pictured as being comprised of a single server. However, the data management system 120 may be comprised on one or more servers and in an embodiment of the present invention, it is comprised of a cloud. In an embodiment of the present invention, a component of the one server, or a dedicated machine where multiple computers comprise the device management system 120, acts as a server-side proxy (not pictured) which interacts with the managed devices 140a-140d and distributes any processing to the server or servers that comprise the device management system 120. The proxy-side server component is involved in distribution of processing and requests when the device management system 120 is a cloud.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. It is understood by one of ordinary skill in the art that any external data processing and storage system with these characteristics would also be included in this disclosure.

One characteristic of the cloud computing model is that a consumer can unilaterally provision computing capabilities, such as CPU power and storage capacity on the network, as needed automatically without requiring human interaction with the service's provider.

The resources of the cloud are available over the network and can be utilized by consumers using a custom thin client, a software application that uses the client-server model where the server performs all the processing, or a standard web browser, running on a user terminal, including but not limited to smart phones, touchpad computers, tablet computers, desktop, and mobile computers, such as laptops.

By taking advantage of the computing power of the cloud system, software providers have the capability to distribute software as a service (SaaS), meaning that a consumer uses a provider's applications running on a cloud's infrastructure. The applications are accessible to the consumer from various user terminals through a thin client interface such as a web browser (e.g., web-based email).

By deploying software into a cloud, the software provider accesses processing, storage, networks, and other fundamental computing resources. The provider does not manage or control the underlying cloud infrastructure but has control over operating systems, storage, deployed applications, and possibly limited control of select networking components (e.g., host firewalls).

The cloud computing model allows services to be delivered through shared data centers that can appear as a single point of entry, or a communications gateway, for a terminal accessing the cloud. For example, a user accessing an application as a service or a platform as a service may use a web browser to connect to a URL. At that URL, the user gains access to the cloud. While accessing the cloud through the web browser, the user will not be aware of the computers or networks that are serving the application and/or platform that the user is accessing. It could be a single computer or an elaborate network. This is not important to the user, as the owner of the cloud works to provide the user with the cloud services seamlessly.

Because the user relies upon the computing power of the cloud and not upon that of the terminal he or she is using to access the cloud, this model is device independence. By utilizing the cloud to provide applications and platforms as a service, the specifications of the device or terminal used to connect to the cloud are non-limiting.

In an embodiment of the present invention the device management system 120 is a cloud that receives data from the satellite 130a-130n and/or the data feed 150 and supplies this data to the managed devices 140a-140d upon request and/or at set intervals. The seemingly unlimited processing power of the cloud assists in decreasing the TTF of the managed devices 140a-140d.

FIG. 1 shows only five clients 140a-140d. This number is used merely for illustrative purposes. Embodiments of the present invention have varying amounts of clients.

Figure 3:
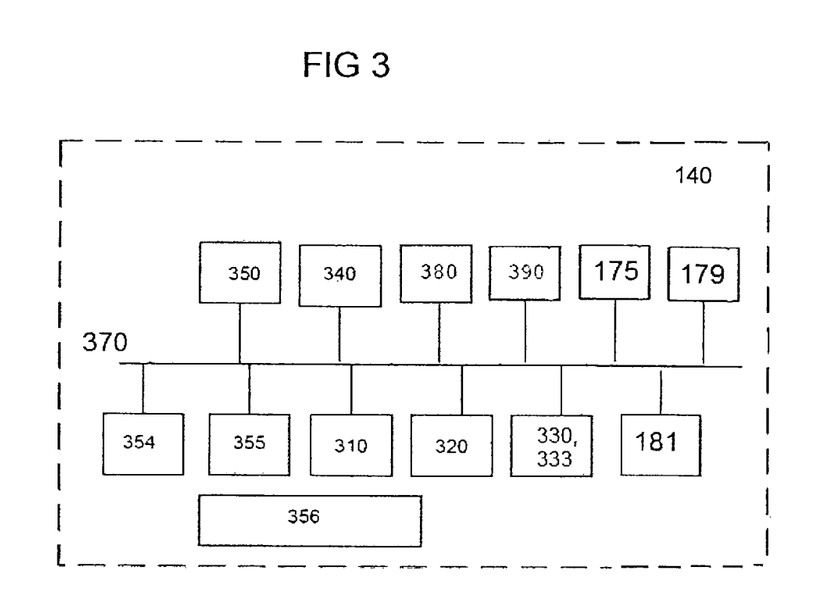
FIG. 3 depicts an aspect of an embodiment of the present invention.

A component-level diagram of an embodiment a client 140, any one of clients 140a-140d as described with reference to FIG. 2. The client 140 can comprise at least one microprocessor 310 and a memory 320, both coupled to the system bus 370. The microprocessor 310 can be provided by a general purpose microprocessor or by a specialized microprocessor (e.g., an ASIC). In one embodiment, client 140 can comprise a single microprocessor which can be referred to as a central processing unit (CPU). In another embodiment, client 140 can comprise two or more microprocessors, for example, a CPU providing some or most of the client functionality and a specialized microprocessor performing some specific functionality. A skilled artisan would appreciate the fact that other schemes of processing tasks distribution among two or more microprocessors are within the scope of this disclosure.

Client 140 can further comprise a communication interface 340 communicatively coupled to the system bus 370. In one embodiment, the communication interface can be provided by a wired or wireless communication interface. The wired or wireless communication interface can be configured to support, for example, but not limited to, the following protocols: at least one protocol of the IEEE 802.3, 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

Client 140 can further comprise a battery 356. In one embodiment, the battery 356 can be provided by a replaceable rechargeable battery pack. The client 140 further comprises a GPS receiver 380. The client 140 can further comprise at least one connector 390 configured to receive a subscriber identity module (SIM) card.

In one embodiment, the client 140 can further comprise a graphical user interface including a display adapter 175 and a keyboard 179. In one embodiment, the client 140 can further comprise an audio output device, e.g., a speaker 181.

The keyboard 179 can be a full QWERTY keyboard and/or limited inputs that start and stop various activities, including, but not limited to scanning a bar code, scanning an RFID tag, initiating and stopping the collection of data from an accelerometer package. The keyboard 179 may be implemented as a touchscreen, discrete keys, or other methods, which in no way limit the scope of the invention.

The client 140 of FIG. 3 is offered merely as an sample architecture. Referring to FIG. 1, clients 140a-140d include, but are not limited to cellular telephones, smart phones, PDAs, laptops, desktops, servers, and EIR terminals, including bar code scanning devices and/or RFID readers, and image capture devices. Clients are any devices that are capable of receiving GPS data.

Referring to FIG. 1, FIG. 3 is also a sample architecture for a resource in the device management system 120, whether the device management system 120 comprises one or more servers (resources) and/or the device management system 120 is a cloud, as seen in FIG. 2.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on processor 310 or on a remote computer systems resource accessible to processor 310 via a communications network.

Figure 4:
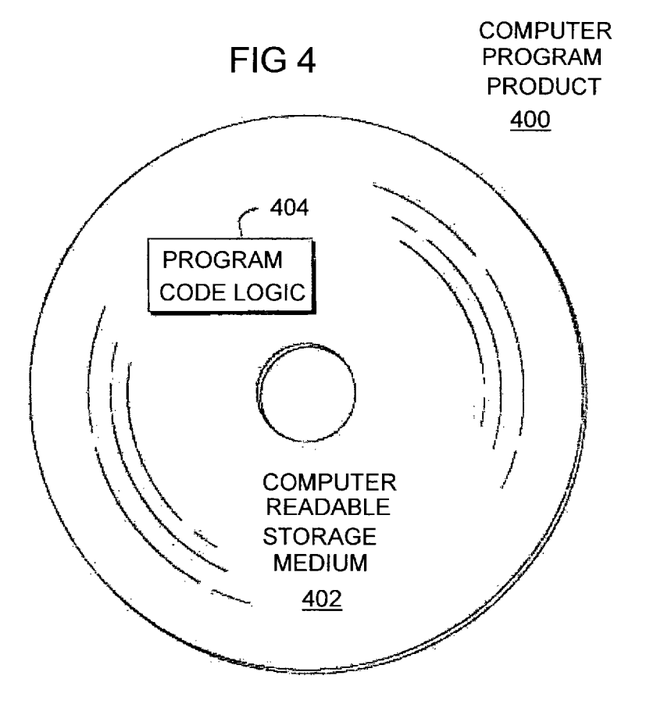
FIG. 4 depicts a computer program product incorporating one or more aspects of the present invention.

Computer-readable code or instructions need not reside on processor 310. Referring to FIG. 4, in one example, a computer program product 400 includes, for instance, one or more non-transitory computer readable storage media 402 to store computer readable program code means or logic 404 thereon to provide and facilitate one or more aspects of the present invention.

Figure 5:
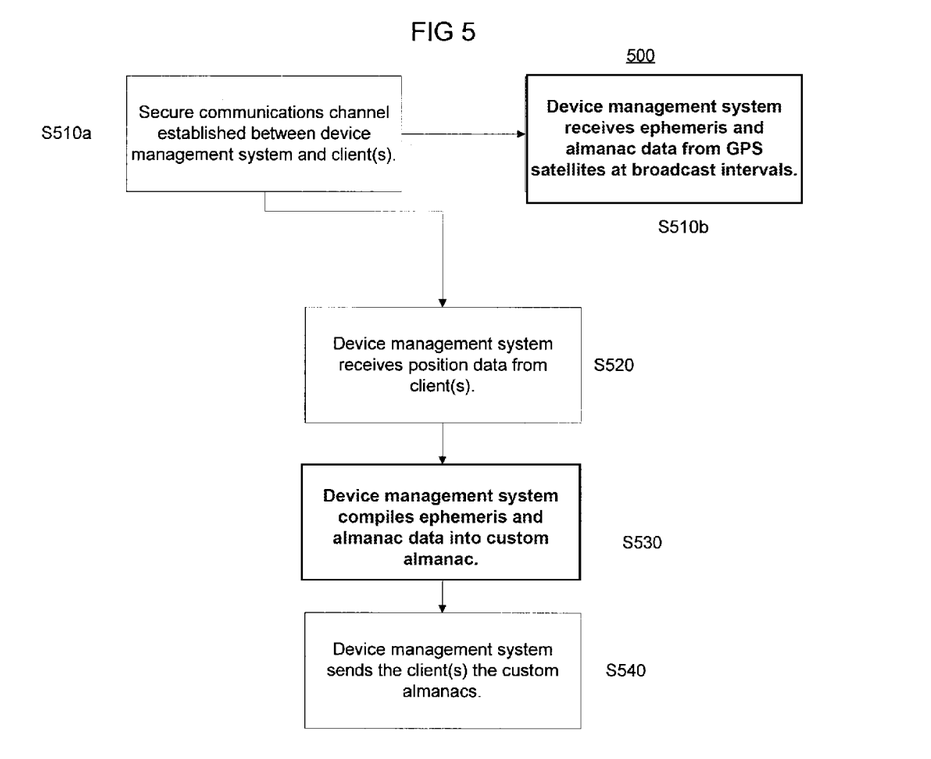
FIG. 5 depicts a workflow of an embodiment of the present invention.

Referring to FIG. 5, a workflow 500 of an embodiment of the present invention begins when a secure communications channel is established between a device management system and at least one client (with a GPS receiver, i.e., capable of receiving GPS data) (S510*a*). While connecting with the GPS receiver(s), the device management system receives ephemeris data from satellites at broadcast intervals, and compiles this data (S510*b*). The device management system receives information from the GPS receiver(s) regarding the position(s) of the GPS receiver(s) (S520). In an embodiment of the present invention, the position data is sent by the GPS receivers in response to a request from the device management system. In another embodiment, the GPS receivers are configured to send position data at pre-set intervals. Based on the receiver position(s), the device management system creates custom ephemeris almanac(s) (S530). The device management system sends the GPS receiver(s) the custom ephemeris almanac(s) (S540).

As aforementioned, in an embodiment of the present invention, the device management system receives ephemeris and almanac data from a data feed instead of, or in addition to the satellites. The addition of the data from the data feed enables the device management system to send relevant ephemeris and almanac data to devices that are not in the same geographic region as the device management system and instead, these devices are in a geographic region where alternate ephemeris and almanac data is needed to utilize GPS services. However, depending upon the embodiment, the data feed can both supplement and/or replace the data from the satellites.

Returning to FIG. 1, in an embodiment of the present invention, the individual GPS receivers 110*a*-110*d* can query the device management system 120 for updated ephemeris data. A client device, any one of 140*a*-140*d*, examines the age of the almanac and extended almanac data received from the device management system. If the client 140 deems this data to be out of date, the client 140 requests updated content from the device management system 120. In response to this request, the device management system 120 creates and sends the client 140 a custom almanac. In further embodiments, the device management system 120 creates and stores current custom almanacs, which it can supply upon request to a client 140 without having to process the data at that time.

Figure 6:
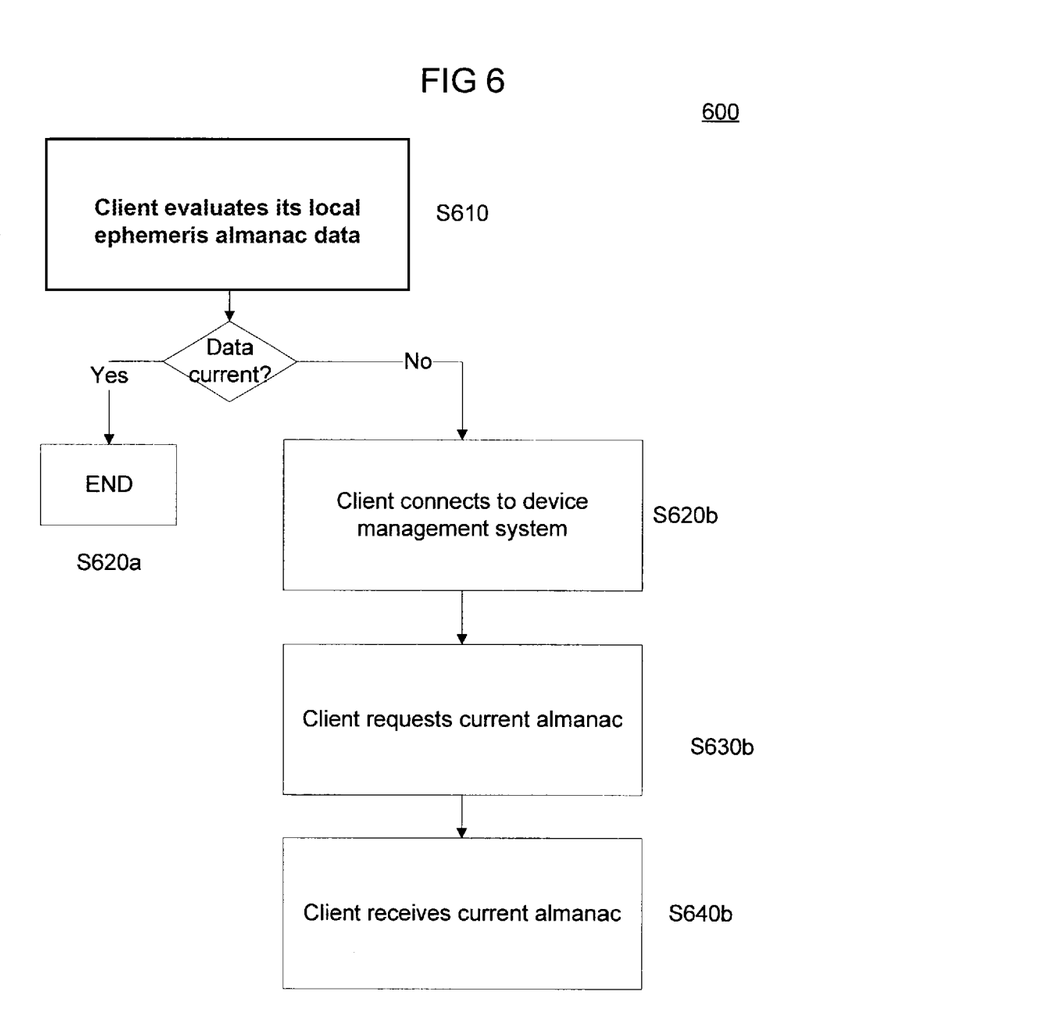
FIG. 6 depicts a workflow of an embodiment of the present invention.

Referring to the workflow 600 of FIG. 6, when a client device with a GPS receiver needs a GPS fix, it first evaluates its local ephemeris almanac data (S610). If the data is current, no further action is required (S620*a*). If the data is not current, the client device connects to the device management system (S620*b*). The client device requests a current almanac (S630*b*). In response to this request, the client device receives the current almanac (S640*b*).

In alternate embodiments of the present invention, client devices are sent updated ephemeris data and almanacs by the device management system continuously in addition to enabling each device to query the device management system for updated data. Also, some device management systems may send the data at set intervals or when refreshed data is available.

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiment with various modifications as are suited to the particular use contemplated.

Although the present invention has been described in relation to particular embodiments thereof, many other variations and modifications will become apparent to those skilled in the art. As such, it will be readily evident to one of skill in the art based on the detailed description of the presently preferred embodiment of the system and method explained herein, that different embodiments can be realized.

The invention claimed is:

1. A device management system comprising a server-side proxy component and at least one back-end computer;
    wherein said server-side proxy component is configured to receive ephemeris and almanac data from a source;
    wherein said server-side proxy component is further configured to receive information from at least one client describing a geographic location of said at least one client;
    wherein said server-side proxy component is further configured to send said ephemeris and almanac data and said information from said at least one client describing said geographic location of said at least one client to said at least one backend computer; and
    wherein said at least one back-end computer is configured, responsive to receiving said ephemeris and almanac data and said information from at least one client describing said geographic location of said at least one client, to compile said ephemeris and almanac data into GPS data relevant to said information from said at least one client describing said geographic location of said at least one client.

2. The device management system of claim 1, wherein said server-side proxy component is further configured to receive a request for said GPS data from said at least one client;
    wherein said server-side proxy component is further configured to transmit said request to said at least one back-end computer; and
    wherein said at least one back-end computer is configured, responsive to receiving said request from said server-side proxy component, to send said GPS data to said at least one client.

3. The device management system of claim 1, wherein said at least one back-end computer is further configured to continuously send said GPS data to said at least one client at fixed time intervals.

4. The device management system of claim 2, wherein said at least one back-end computer is further configured to continuously send said GPS data to said at least one client at fixed time intervals.

5. The device management system of claim 2, wherein said source is at least one of: at least one GPS satellite, a data feed.

6. The device management system of claim 3, wherein said source is at least one of: at least one GPS satellite, a data feed.

7. The device management system of claim 1, wherein said server-side proxy component and said at least one back-end computer are located on the same physical device.

8. The device management system of claim 1, wherein said server-side proxy component is further configured to request information from at least one client describing a geographic location of said at least one client.

9. A method for transmitting GPS data, the method comprising the steps of:
- a computer receiving ephemeris and almanac data from a server-side proxy component said server-side proxy component having received said ephemeris and almanac data from a source;
- said computer receiving information describing a geographic location of at least one client from a server-side proxy component said server-side proxy component having received said information describing a geographic location of at least one client from said at least one client; and
- said computer, responsive to receiving said ephemeris and almanac data and said information describing a geographic location of at least one client, compiling said ephemeris and almanac data into GPS data relevant to said information from said at least one client describing said geographic location of said at least one client.

10. The method of claim 9, further comprising:
said computer receiving a request for said GPS data from said server-side proxy said server-side proxy having received said request from said at least one client; and
said computer transmitting said GPS to said at least one client.

11. The method of claim 9, further comprising:
said computer transmitting said GPS data to said at least one client at fixed time intervals.

12. The method of claim 10, further comprising:
said computer transmitting said GPS data to said at least one client at fixed time intervals.

13. The method of claim 9, wherein said source is at least one of:
at least one GPS satellite, a data feed.

14. A computer program product for transmitting GPS data, the computer program product comprising:
- one or more computer-readable, tangible storage devices being non-transitory computer readable medium;
- program instructions, stored on at least one or more storage devices being non-transitory computer readable medium, to receive ephemeris and almanac data from a source;
- program instructions, stored on at least one or more storage devices being non-transitory computer readable medium, to receive information from at least one client describing a geographic location of said at least one client; and
- program instructions, stored on at least one or more storage devices being non-transitory computer readable medium, to compile said ephemeris and almanac data into GPS data relevant to said information from said at least one client describing said geographic location of said at least one client.

15. The computer program product of claim 14, further comprising:
- program instructions, stored on at least one or more storage devices being non-transitory computer readable medium, to receive a request for said GPS data from said at least one client; and
- program instructions, responsive to receiving said request from said server-side proxy component, to send said GPS data to said at least one client.

16. The computer program product of claim 14, further comprising:
- program instructions, stored on at least one or more storage devices being non-transitory computer readable medium to continuously send said GPS data to said at least one client at fixed time intervals.

17. The computer program product of claim 15, further comprising:
- program instructions, stored on at least one or more storage devices being non-transitory computer readable medium to continuously send said GPS data to said at least one client at fixed time intervals.

* * * * *